Figure 1:
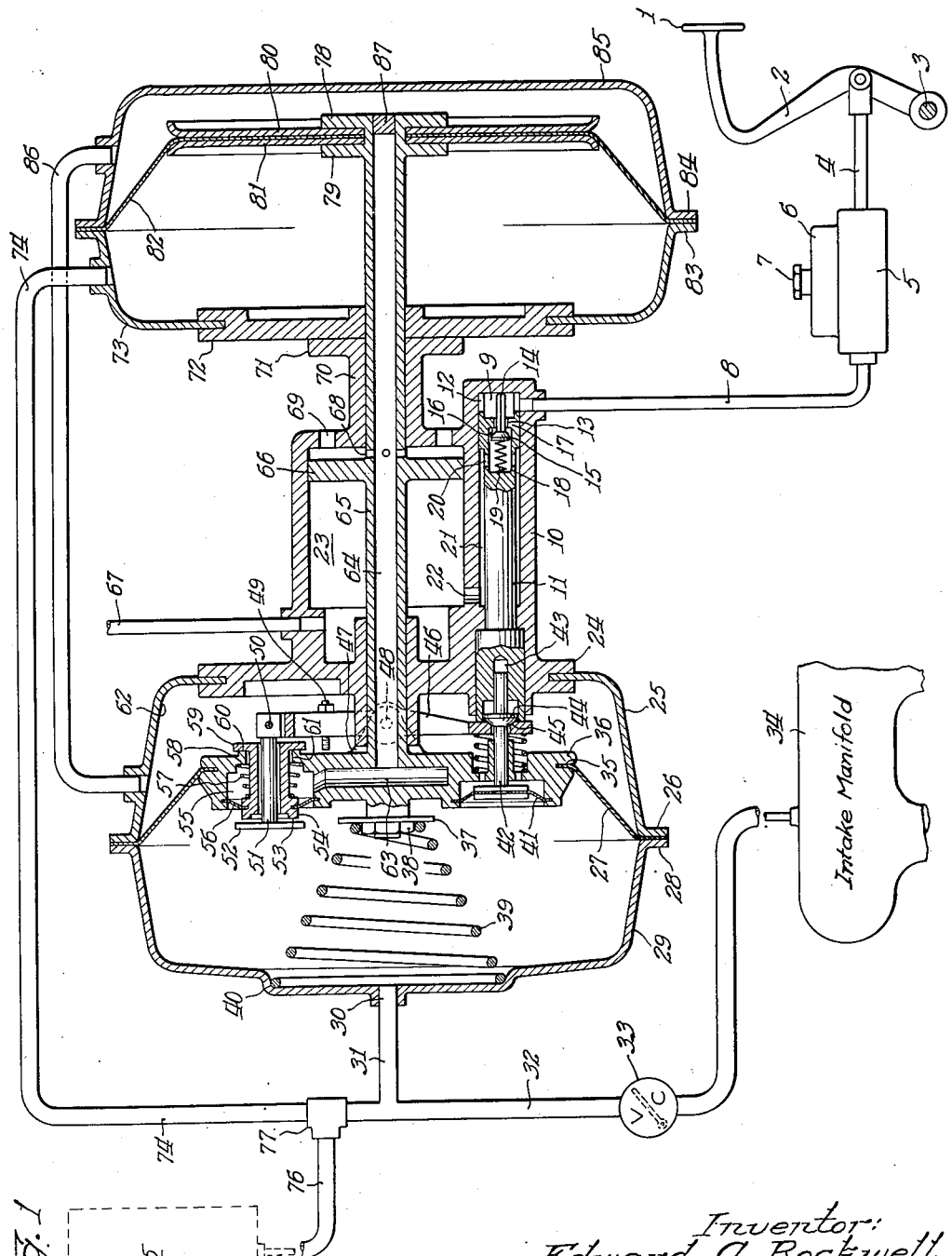

Inventor:
Edward A. Rockwell
By: Edward C. Gritzbaugh
Atty.

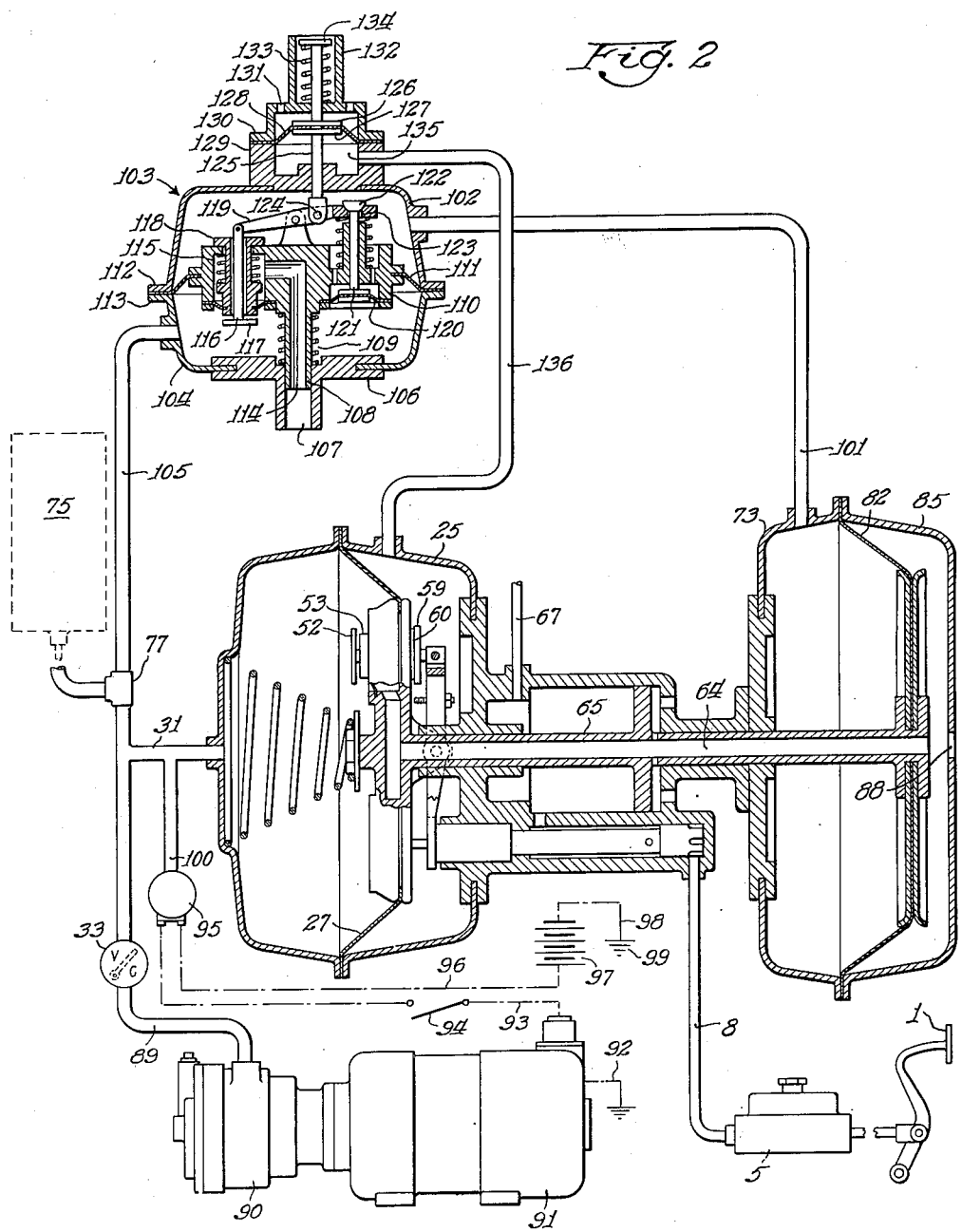

Patented Dec. 5, 1950

2,532,462

UNITED STATES PATENT OFFICE 2,532,462

COMPACT POWER UNIT

Edward A. Rockwell, Shaker Heights, Ohio, assignor, by mesne assignments, to Borg-Warner Corporation, Chicago, Ill., a corporation of Illinois Application August 22, 1945, Serial No. 611,984

10 Claims. (Cl. 60—54.6)

My invention relates particularly to power units which are adapted to apply power for the operation of any desired type of device but which are especially applicable for the operation of accessories of automotive vehicles, airplanes, etc.

The object of my invention is to provide a power unit of the above character which is compact in construction and which may be applied wherever desired, especially because of its small dimensions. A further object is to provide a power unit of small diameter for this purpose. Other objects are to provide devices of this character which involve a vacuum suspended movable wall or plunger for applying the power by a pulling action but which are aided by a subsidiary pusher plunger which may be either vacuum suspended or air suspended. Further objects of my invention will appear from the detailed description of the same hereinafter.

While my invention is capable of embodiment in many different forms, for the purpose of illustration I have shown only two forms thereof in the accompanying drawings, in which:

Fig. 1 is a diagrammatic vertical section of a power unit apparatus made in accordance with my invention, in which a vacuum suspended auxiliary power plunger is used in its off position; and Fig. 2 is a diagrammatic vertical section of a modification thereof, utilizing an air suspended auxiliary power plunger showing the position in which air has been admitted to the relay valve.

In the drawings, referring first to Fig. 1, in which the power plungers are both normally vacuum suspended, I have shown a pedal 1 mounted on a pedal lever 2 supported by a fixed pivot 3 from the chassis of an automobile. The pedal lever 2 is connected by a piston rod 4 to a piston (not shown) in the usual type of master cylinder 5 having a reservoir 6 and a vented removable filling cap 7. The master cylinder 5 is connected by a pipe 8 to convey the hydraulic liquid under the manual pressure from the pedal 1 to a cylindrical chamber 9 in a plunger housing 10. Within the chamber 9 there is provided a manually operable plunger 11 having on its right hand end a plurality of spaced projections 12 which contact with the end of the cylindrical chamber 9 in retracted position. Also, in the plunger 11 there is a central passageway 13 for receiving a fluted valve stem 14 of a conical cut-off valve 15 which cooperates with a valve seat 16 on a shoulder 17 in the end of a valve chamber 18 containing a helical spring 19 urging the said conical valve 15 toward the right for seating the same on the valve seat 16, except when the valve stem 14 contacts with the end of the cylindrical chamber 9. A plurality of radial ports 20 connect the valve chamber 18 with an annular space 21 around the plunger 11 and which has a port 22 connecting it to an intensified pressure cylinder 23.

A flange 24 is provided on the plunger housing 10 for securing tightly thereto a dished diaphragm casing 25 having a flange 26 for clamping thereon a flexible diaphragm 27 against a flange 28 of another dished diaphragm casing 29. The diaphragm casing 29 has a vacuum inlet port 30 connected by a pipe 31 to a vacuum pipe 32, containing a vacuum check valve 33, and leading to a manifold 34 of an internal combustion engine used for driving the automobile.

The inner portion of the flexible diaphragm 27 is securely fastened within a recess 35 in a clamping plate 36 carrying a spring supporting plate 37, held in place by a screw 38, for supporting a helical retracting spring 39, the other end of which is supported in a recess 40 in the diaphragm casing 29. In the clamping plate 36, furthermore, there is provided a pressure compensating diaphragm 41 having attached thereto a stem 42, the other end of which is supported in a cylindrical recess 43 in the end of the manually operated plunger 11. On the said stem 42, furthermore, there is a peripheral flange 44 to contact with an opening 45 in a valve-operating lever 46 carried on ears 47 by means of pivots 48 mounted on either side of the diaphragm clamping plate 36. A screw-threaded adjustable rod 49 is, also, carried in the lever 46 so as to limit the movement of the lever 46 by the rod 49 contacting with the clamping plate 36. On the end of the valve lever 46 there is a pivot 50 connecting the same to a valve operating rod 51 having on the other end thereof a disc-shaped vacuum valve member 52 which cooperates with a valve seat 53 on a tubular valve member 54 passing through a valve chamber 55 in the clamping plate 36 where it is supported by means of a subsidiary diaphragm 56 supported at its periphery in the clamping plate 36 and fastened at its inner portion to the tubular valve member 54. A helical spring 57 rests at one end against the tubular valve member 54 and at its other end is supported by a shoulder 58 in the chamber 55. The right hand end of the tubular valve member 54 has a disc-shaped air inlet valve member 59 cooperating with a valve seat 60 around an annular passageway 61 which connects the chamber 55 with a chamber 62 within the diaphragm casing 25. An air passageway 63 is provided in the clamping plate 36 which connects with an air passageway 64 in an intensifying plunger rod 65 provided with an intensifying piston 66 in the pressure intensifying cylinder 23 and which has a hydraulic pressure fluid outlet conduit 67 leading to the wheel brake cylinders of the four wheels of the automobile (not shown) in the usual way. The intensifying piston rod 65 also has a plurality of radial ports 68 leading to the chamber 23 on the right hand face of the piston 66 which communicates with the outer air through a series of ports 69. Furthermore, the rod 65 passes through a tubular extension 70 having a flange 71 to which there is secured an end plate 72 having attached thereto an auxiliary diaphragm casing 73 connected by means of a pipe 74 to the vacuum pipe 31 and which may, if desired, have attached thereto a vacuum reservoir 75 connected by a pipe 76 and a T-joint 77 to said pipe 74. On the other end of the intensifying piston rod 65, there are a plurality of flanges 78 and 79 for fastening thereto diaphragm supporting plates 80 and 81 carrying between the same a flexible diaphragm 82, the outer periphery of which is secured between a flange 83 on the auxiliary diaphragm casing 73 and a flange 84 on a second auxiliary diaphragm casing 85 which is connected by a pipe 86 to the chamber 62 at the right hand side of the flexible diaphragm 27. A plug 87 closes the end of the passageway 64 in the intensifying piston rod 65.

In the modification of my invention, as shown in Fig. 2, I have provided a similar power unit construction in which the auxiliary flexible diaphragm 82 is mounted between the auxiliary diaphragm casings 73 and 85 but in which the diaphragm 82 is normally air suspended. For this purpose, accordingly, the auxiliary diaphragm casing 85 is provided with an air port 88 and the intensifying piston rod passageway 64 is open to the air chamber in the diaphragm casing 85, by the plug 87 above referred to being omitted therefrom.

Also, in this instance, instead of providing a vacuum from the manifold 34, if desired a source of constant vacuum may be provided by a separate electrical power means, and in fact, if desired, this separate electrically driven power means may be substituted for the connection to the intake manifold in the form of my invention as set forth in Fig. 1. In Fig. 2, for this purpose there is shown attached to the vacuum pipe 31 the vacuum check valve 33, as in the case of Fig. 1, but in this instance to said check valve 33 there is connected a pipe 89 leading to the outlet side of a rotary vacuum pump 90 driven by an electric motor 91 having a ground connection 92 and a wire 93 leading by a manually operable switch 94 to a spring pressed vacuum cut-out electrical switch 95 constructed in any suitable manner, the other terminal of which leads by a wire 96 to a battery or other source of electric current 97 connected by a wire 98 to a ground 99. This vacuum cut-out switch 95 is connected by a pipe 100 to the pipe 31 so that when a sufficient degree of vacuum is attained in the pipe 31 the circuit through the wires 93 and 96 is broken by a pressure responsive element until the desired level of vacuum is no longer present in the pipe 31, whereupon the switch 95 will again complete the circuit through the electric motor 91 and drive the vacuum pump 90 to restore the desired degree of vacuum.

In this instance, furthermore, the diaphragm casing 73, instead of being provided with the vacuum pipe 74, has connected thereto a pipe 101 which leads to an upper diaphragm casing 102 of a relay valve 103. The relay valve 103, also, has a lower diaphragm casing 104 which is connected by a pipe 105 to the T-joint 77 leading to the vacuum reservoir 75 and also to the pipe 31. Within the lower diaphragm casing 104 there is an end plate 106 having a vent 107 leading to the outer air. Controlled amounts of air are conveyed from the vent 107 through a hollow stem 108 reciprocable within the same and around which there is located a coil spring 109 connected to a diaphragm clamping plate 110 which clamps in place the inner portion of a diaphragm 111, the outer periphery of which is clamped between flanges 112 and 113 of the diaphragm casings 102 and 104, respectively. Furthermore, within the diaphragm clamping plate 110 there is an air passageway 114 which conveys the air from the vent 107 to a valve chamber 115 having therein a valve stem 116 for operating a vacuum inlet valve 117 and an air inlet valve 118, both of which are constructed in the same manner as the valve 52, 53 and the valve 59, 60 respectively, previously described herein. In this instance there is a valve operating lever 119, like the valve operating lever 46, mounted on the diaphragm clamping plate 110, the end of which lever is connected to a compensating diaphragm 120 in the same manner as in the case of the pressure compensating diaphragm 41, previously described herein. For this purpose, the diaphragm 120 has a diaphragm rod 121 having a head 122 supported in an opening 123 in the end of the valve rod 119. In this instance, there is a pivotal connection 124 on the valve rod 119 which is connected by a diaphragm-operated rod 125 having thereon disc-shaped clamping members 126 and 127, which support the inner portion of a pressure responsive diaphragm 128, the outer periphery of which is clamped between a lower cylindrical diaphragm casing 129 and an upper diaphragm casing 130. The upper diaphragm casing 130, furthermore, has vent openings 131 and is provided with a hollow extension 132 having therein a helical spring 133 supported at its lower end on the diaphragm casing 130 and at its upper end against a flange 134 secured to the stem 125. Within the diaphragm casing 129 there is a chamber 135 connected by a pipe 136 to the main diaphragm casing 25.

In the operation of my invention, referring first to the form of my invention as shown in Fig. 1, the manual movement of the pedal 1 will cause the main cylinder 5 to deliver the hydraulic liquid under manual pressure to the chamber 9, whereupon, inasmuch as the valve 15 is open in the retracted position of the manual plunger 11, the hydraulic liquid will be forced out through the ports 20 into the chamber 21 and thence by the ports 22 to the intensifying cylinder 23 and therefrom by the pipe 67 to the wheel brake cylinders (not shown). As this pressure increases, however, which takes place substantially immediately after the depression of the pedal 1, the manual piston 11 will be moved to the left, in Fig. 1, thereby closing the cut-off valve 15 and moving the valve lever 46. Prior to the movement of the valve lever 46, vacuum will be present on both sides of the diaphragm 27 inasmuch as the vacuum is supplied thereto from the manifold 34 or the vacuum reservoir 75 or both, through the pipe 31, the check valve 33 maintaining trapped the vacuum which has been supplied to the interior of the power unit in this way on the left face of the diaphragm 27. Initially, this vacuum will also be present on the right side of the diaphragm 27 in the chamber 62 due to the vacuum valve 52, 53 being initially in open position.

When, as above referred to, the valve lever 46 will have been moved due to the increase of the manual pressure applied to the pipe 8, the vacuum valve 52, 53 will become closed while the air valve 58, 59 is also closed, and further pressure from the pipe 8 will, thereafter, unseat the air valve 58, 59, thus admitting air from the air vent 69 through the ports 68, passageway 64 and passageway 63. In this way controlled amounts of atmospheric air pressure are admitted to the chamber 62 on the right face of the diaphragm 27, thus applying power to the intensifying piston due to the smaller size of the piston 66 as compared with the diaphragm 27. In this way the intensified hydraulic liquid pressure is conveyed by the pipe 67 to apply power to the wheel brake cylinders on the four wheels of the automobile after the brakes have been set previously by the manual pressure initially received from the pipe 8 and passing directly therefrom to the wheel brake cylinders. In this way, any desired intensified hydraulic pressure can be applied for the operation of the wheel brakes. This intensified pressure is, also, aided and increased by the auxiliary diaphragm 82, to the right face of which there is applied the same controlled amounts of atmospheric air pressure by means of the pipe 86, the left face of the diaphragm 82 being supplied at all times by vacuum through the pipe 74, as in the case of the left face, also, of the diaphragm 27. In any one desired position for the application of power pressure through the pipe 67 to the wheel brake cylinders, it will be understood that the valves 52, 53 and 59, 60 will be in lapped position, provided that the hydraulic pressures from the pipe 8 are not being increased or decreased. When it is desired to relax the pressures on the wheel brake cylinders, the manual pressure on the pedal 1 is relaxed to the desired extent, whereupon some of the hydraulic pressure on the manual plunger 11 will be relaxed, thus admitting additional vacuum through the valve 52, 53 to the chamber 62 on the right face of the diaphragm 27. When the manual pressure is removed entirely from the pedal 1 the manual plunger 11 will be retracted to the right hand end of the cylinder 9 by the force of the spring 39 and the liquid in the system will become equalized between the brake cylinders and the master cylinder 5 owing to the cut-off valve 15 being in open position by reason of the valve stem 14 contacting with the end of the cylinder 9.

In the operation of the modified form of my invention shown in Fig. 2, the operation is similar to that in connection with the apparatus shown in Fig. 1. In this instance, however, the vacuum may be supplied, instead of from the intake manifold 34, by means of the vacuum pump 90 driven by the electric motor 91, the operation of which is controlled by the vacuum cutout electric switch 95 which completes the circuit to drive the motor 91 and operate the pump 90 only when insufficient levels of vacuum are being supplied to the pipe 100 through the pipe 31 and the reservoir 75. In this instance, the diaphragm 27 supplies the power pressure hydraulically through the pipe 67 to the wheel brake cylinders, as in the case of the form of my invention shown in Fig. 1, except that in this instance auxiliary power is applied to the intensifying plunger rod 65 by means of the air suspended diaphragm 82. In other words, in this instance atmospheric air pressure is always supplied to the right face of the diaphragm 82 by the vent 88 and controlled amounts of vacuum are supplied to the left face of the diaphragm 82 by the pipe 101. The amount of the vacuum pressure thus admitted through the pipe 101 is determined by the air pressure in the pipe 136 from the diaphragm casing 25 bearing on the flexible diaphragm 128. This controls the vacuum admitted by means of the diaphragm rod 125 moving the valve lever 119 to close the normally open air valve 118 which normally supplies air to the left face of the diaphragm 82, after which further movement of the valve lever 119 opens the vacuum valve 117 to admit controlled amounts of vacuum from the lower diaphragm casing 104 to the upper diaphragm casing 102 and thence through the pipe 101 to the diaphragm casing 73, thus supplying added power to the intensifying plunger rod 65. In any one position of the pedal 1, the valves 118, as well as 117, will assume lapped position, as in the case, also, of the valves 52, 53 and 59, 60. Upon any relaxation of the manual pressure on the pedal 1 the air valve 118 will become opened to some extent, thereby conveying some air pressure through the pipe 101 to the left face of the diaphragm 82 at the same time that some additional vacuum pressure is admitted to the right face of the diaphragm 27 through the vacuum valve 52, 53, thus decreasing to the extent desired the braking effect. Upon entirely relaxing the manual pressure on the pedal 1, the air valve 118 will become opened and the vacuum valve 52, 53 will likewise be open, thus restoring the diaphragm 82 to its air suspended position and the diaphragm 27 to its vacuum suspended position.

While I have described my invention above in detail, I wish it to be understood that many changes may be made therein without departing from the spirit of the same.

I claim:

1. A power unit comprising a connection on the power unit adapted to be connected to a source of pressure differing from the atmospheric pressure, a movable wall, an auxiliary movable wall on the same axis as the first-mentioned wall, chambers for both said walls, valve means controlling the application of said pressure and atmospheric air to each of the movable walls, manual hydraulic means for operating the valve means, and a hydraulic intensifier piston and cylinder located between the chambers of said movable walls, having a hydraulic connection to a device for performing work.

2. A power unit comprising a connection on the power unit adapted to be connected to a source of pressure differing from the atmospheric pressure, a movable wall, an auxiliary movable wall on the same axis as the first-mentioned wall, chambers for both said walls, a valve means controlling the application of said pressure and atmospheric air to each of the movable walls, manual hydraulic means for operating the valve means, and a hydraulic intensifier piston and cylinder located between the said movable walls having a hollow vented piston rod extending to both said walls and a hydraulic connection to a device for performing work.

3. A power unit comprising a connection on the power unit adapted to be connected to a source of pressure differing from the atmospheric pressure, a movable wall, an auxiliary movable wall on the same axis as the first-mentioned wall, chambers for both said walls, a valve means controlling the application of said pressure and atmospheric air to each of the movable walls, manual hydraulic means for operating the valve means, and a hydraulic intensifier piston and cylinder located between the said movable walls having a hollow vented piston rod extending to both said walls and a hydraulic connection to a device for performing work, said vented rod being in communication with an air port in the cylinder of said piston.

4. A power unit comprising a connection on the power unit adapted to be connected to a source of pressure differing from the atmospheric pressure, a movable wall, an auxiliary movable wall on the same axis as the first-mentioned wall, chambers for both said walls, a valve means controlling the application of said pressure and atmospheric air to each of the movable walls, manual hydraulic means for operating the valve means including a pressure compensating diaphragm mounted on the movable wall, a manually operated plunger and a valve lever at one side of said piston, and a hydraulic intensifier piston and cylinder located between the said movable walls, having a hydraulic connection to a device for performing work.

5. A power unit comprising a connection on the power unit adapted to be connected to a source of pressure differing from the atmospheric pressure, a movable wall, an auxiliary movable wall on the same axis as the first-mentioned wall, both of said walls being normally vacuum suspended, chambers for both said walls, a valve means controlling the application of said pressure and atmospheric air to each of the movable walls, manual hydraulic means for operating the valve means, and a hydraulic intensifier piston and cylinder located between the said movable walls and having a hollow vented piston rod connected to both of said walls, having a hydraulic connection to a device for performing work.

6. A power unit comprising a connection on the power unit adapted to be connected to a source of vacuum, a movable wall, an auxiliary movable wall, one of said walls being normally vacuum suspended and the other normally air suspended, chambers for both said walls, valve means controlling the application of said vacuum and atmospheric air to each of the movable walls, manual hydraulic means for operating the valve means, and a hydraulic intensifier piston and cylinder located between the chambers of said movable walls, having a hydraulic connection to a device for performing work.

7. A power unit comprising a connection on the power unit adapted to be connected to a source of vacuum, a movable wall, an auxiliary movable wall, one of said walls being normally vacuum suspended and the other normally air suspended, chambers for both said walls, a valve means controlling the application of said vacuum and atmospheric air to each of the movable walls, manual hydraulic means for operating the valve means, a hydraulic intensifier piston and cylinder located between the said movable walls, having a hydraulic connection to a device for performing work and a relay valve controlled by the atmospheric air admitted to the first-mentioned wall and arranged to govern the admission of said pressure to the auxiliary movable wall.

8. A power unit comprising a connection on the power unit adapted to be connected to a source of vacuum, a movable wall, an auxiliary movable wall on the same axis as the first-mentioned wall, chambers for both said walls, one of said walls being normally vacuum suspended and the other normally air suspended, valve means controlling the application of said vacuum and atmospheric air to each of the movable walls, manual hydraulic means for operating the valve means, and a hydraulic intensifier piston and cylinder located between the said movable walls having a hydraulic connection to a device for performing work, and having a hollow vented piston rod extending to both said walls, and through the auxiliary movable wall.

9. A power unit comprising a connection on the power unit adapted to be connected to a source of fluid pressure differing from the atmosphere, a movable wall, a cylinder therefor, a puller plunger having a hydraulic piston connected to said wall having a hydraulic cylinder, another movable wall, a cylinder therefor, a pusher plunger connected to said piston, an inlet for hydraulic liquid to control the power unit leading to the hydraulic piston cylinder and a hydraulic outlet conduit from said hydraulic piston cylinder to a part to perform work.

10. A power unit comprising a connection on the power unit adapted to be connected to a source of fluid pressure differing from the atmosphere, a movable wall, a cylinder therefor, a puller plunger having a hydraulic piston connected to said wall having a hydraulic cylinder, another movable wall, a cylinder therefor, a pusher plunger connected to said piston, an inlet for hydraulic liquid to control the power unit leading to the hydraulic piston cylinder and a hydraulic outlet conduit from said hydraulic piston cylinder to a part to perform work, said inlet having connected thereto a plunger operated valve mechanism for controlling the application of said fluid pressure to the said movable walls.

EDWARD A. ROCKWELL.

REFERENCES CITED

The following references are of record in the file of this patent:

UNITED STATES PATENTS

| Number | Name | Date |
| --- | --- | --- |
| 1,788,378 | Bragg | Jan. 13, 1931 |
| 1,788,379 | Bragg | Jan. 13, 1931 |
| 1,978,667 | Breese | Oct. 30, 1934 |
| 2,098,666 | La Brie | Nov. 9, 1937 |
| 2,138,236 | Horton | Nov. 29, 1938 |
| 2,260,490 | Stelzer | Oct. 28, 1941 |
| 2,336,374 | Stelzer | Dec. 7, 1943 |
| 2,393,524 | Fant | Jan. 22, 1946 |
| 2,398,252 | Rockwell | Apr. 9, 1946 |

FOREIGN PATENTS

| Number | Country | Date |
| --- | --- | --- |
| 329,680 | France | June 6, 1903 |